US008910052B2

(12) United States Patent
Deng et al.

(10) Patent No.: US 8,910,052 B2
(45) Date of Patent: Dec. 9, 2014

(54) TAGGING USERS OF A SOCIAL NETWORKING SYSTEM IN AN EXPERIENCE IN A USER'S USER PROFILE

(75) Inventors: Peter Deng, San Francisco, CA (US); William Joseph Flynn, III, San Francisco, CA (US); Josh Wiseman, San Francisco, CA (US); Matthew Cahill, Redwood City, CA (US); Philip Sanghoon Rha, San Francisco, CA (US); Martin Smith, Santa Clara, CA (US)

(73) Assignee: Facebook, Inc., Menlo Park, CA (US)

(*) Notice: Subject to any disclaimer, the term of this patent is extended or adjusted under 35 U.S.C. 154(b) by 195 days.

(21) Appl. No.: 12/960,489

(22) Filed: Dec. 4, 2010

(65) Prior Publication Data

US 2012/0144316 A1 Jun. 7, 2012

(51) Int. Cl.
*G06F 3/048* (2013.01)
*G06Q 50/00* (2012.01)
*G06F 17/30* (2006.01)
*G06Q 30/02* (2012.01)
*G06F 3/0484* (2013.01)

(52) U.S. Cl.
CPC .......... *G06Q 50/01* (2013.01); *G06F 17/30702* (2013.01); *G06Q 30/02* (2013.01); *G06F 3/04847* (2013.01)
USPC ........... 715/744; 705/319; 707/733; 707/784; 707/805; 715/733; 715/738; 715/745; 715/751

(58) Field of Classification Search
CPC ............... G06Q 10/10–10/1053; G06Q 50/01; G06F 17/30702; G06F 3/0481; H04L 67/306; G04L 51/32

USPC .......................... 707/600–899; 709/200–253; 715/200–867; 705/319
See application file for complete search history.

(56) References Cited

U.S. PATENT DOCUMENTS

| | | | |
|---|---|---|---|
| 7,603,371 B1 * | 10/2009 | Pathak et al. | 1/1 |
| 8,010,460 B2 * | 8/2011 | Work et al. | 705/319 |
| 8,504,559 B1 * | 8/2013 | Elman et al. | 707/722 |
| 2003/0065670 A1 * | 4/2003 | Bisson et al. | 707/100 |
| 2005/0177385 A1 * | 8/2005 | Hull et al. | 705/1 |
| 2005/0177614 A1 * | 8/2005 | Bourne | 709/200 |
| 2006/0042483 A1 * | 3/2006 | Work et al. | 101/91 |
| 2006/0064436 A1 * | 3/2006 | Fowler et al. | 707/104.1 |
| 2007/0192299 A1 * | 8/2007 | Zuckerberg et al. | 707/3 |
| 2007/0198474 A1 * | 8/2007 | Davidson et al. | 707/3 |
| 2007/0214141 A1 * | 9/2007 | Sittig et al. | 707/7 |
| 2008/0091723 A1 * | 4/2008 | Zuckerberg et al. | 707/104.1 |
| 2008/0172363 A1 * | 7/2008 | Wang et al. | 707/3 |
| 2008/0234862 A1 * | 9/2008 | Funada et al. | 700/246 |
| 2009/0187569 A1 * | 7/2009 | Lubarski et al. | 707/6 |

(Continued)

*Primary Examiner* — William Bashore
*Assistant Examiner* — Linda Huynh
(74) *Attorney, Agent, or Firm* — Fenwick & West LLP

(57) ABSTRACT

A user profile for a user of a social networking system may include experiences, such as work, educational, travel, and interests. The social networking system provides a profile page for a user's user profile that allows the user to tag other users as being involved in or otherwise associated with the user's experiences. Once another user is tagged in an experience, a corresponding tag is added to the tagged user's user profile, and that experience is added as well if not already included in the profile. Tagging users in experiences allows a viewer to see connections between experiences of users of the social networking system and promotes more detailed user profiles that contain experiences.

21 Claims, 6 Drawing Sheets

(56) References Cited

U.S. PATENT DOCUMENTS

| | | | |
|---|---|---|---|
| 2009/0241035 A1* | 9/2009 | Tseng et al. | 715/753 |
| 2009/0327054 A1* | 12/2009 | Yao et al. | 705/12 |
| 2010/0082683 A1* | 4/2010 | Law et al. | 707/784 |
| 2010/0145965 A1* | 6/2010 | Basson et al. | 707/758 |
| 2011/0029512 A1* | 2/2011 | Folgner et al. | 707/726 |
| 2011/0087674 A1* | 4/2011 | Schokking et al. | 707/748 |
| 2011/0106550 A1* | 5/2011 | Skelton | 705/1.1 |
| 2011/0137902 A1* | 6/2011 | Wable et al. | 707/737 |
| 2011/0185020 A1* | 7/2011 | Ramamurthy et al. | 709/204 |
| 2011/0208822 A1* | 8/2011 | Rathod | 709/206 |
| 2011/0276570 A1* | 11/2011 | Larsson et al. | 707/736 |
| 2011/0282947 A1* | 11/2011 | Dodson | 709/206 |
| 2012/0110071 A1* | 5/2012 | Zhou et al. | 709/204 |
| 2012/0116907 A1* | 5/2012 | Skelton et al. | 705/26.1 |
| 2012/0124479 A1* | 5/2012 | Morin et al. | 715/741 |
| 2013/0212180 A1* | 8/2013 | Work et al. | 709/204 |

\* cited by examiner

TAGGING USERS OF A SOCIAL NETWORKING SYSTEM IN AN EXPERIENCE IN A USER'S USER PROFILE

BACKGROUND

This invention relates generally to social networking, and in particular to providing a user profile for a user of a social networking system that includes experiences in which other social networking system users can be tagged.

Social networking systems have become prevalent in recent years because they provide a useful environment in which users can connect to and communicate with other users. A variety of different types of social networking systems exist that provide mechanisms allowing users to interact within their social networks.

One common characteristic of social networking systems is providing a user profile where the user can provide information about the user's experiences, such as educational experiences, work experiences, and the like. Typically the information is organized into linear information, intended for viewing only, provides few if any common information between users, and actions are not taken upon the experiences themselves. However, richer information about the user experiences is left out. For example, that a user worked at a specific employer for a certain number of years provides little information about what the user did at the employer, what was his progression through the company, etc.

In addition, many connections between users are missed by such strictly informational user profiles. Many user who are connections of each others have shared experiences in common, but those shared experiences between users are absent from the user profiles unless they are compared side by side for the users. For example, a first user's profile page may list that he worked at Company X during the time period 2000-2006. A second user's profile lists that she worked at Company X overlapping with that time period, 1999-2005. At best typical profiles list a job title. However, looking at the information on the first user's profile, the viewer would have no way of knowing that the second user worked with the first user on a project spanning the years 2001-2003 by viewing either profile alone, and likely might not even recognize that the two users had any common employer.

SUMMARY

To enable a social networking system to provide richer experience information viewable by other users, embodiments of the invention provide a mechanism for tagging other users in user profile experiences. Using information maintained in user profiles, user experiences are included in a display of a user profile for a user of a social networking system. A user may add to an experience on his user profile and may add an indication that another user was associated with the experience, the indicating providing a "tag" linking the other user to the tagged experience. An interface is provided for editing the individual experiences, including adding experiences at any level, and tagging other users. Once another user is tagged in a user's experience, the corresponding tag is added to the tagged user's profile, and the experience is added as well, if not already included in it. Tagged users can remove tags if desired.

Accordingly, embodiments of the invention allow the social networking system to provide a user profile that includes user experiences in which other users may be tagged as associated with the experience.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of a Social Networking System Architecture

Figure 1:
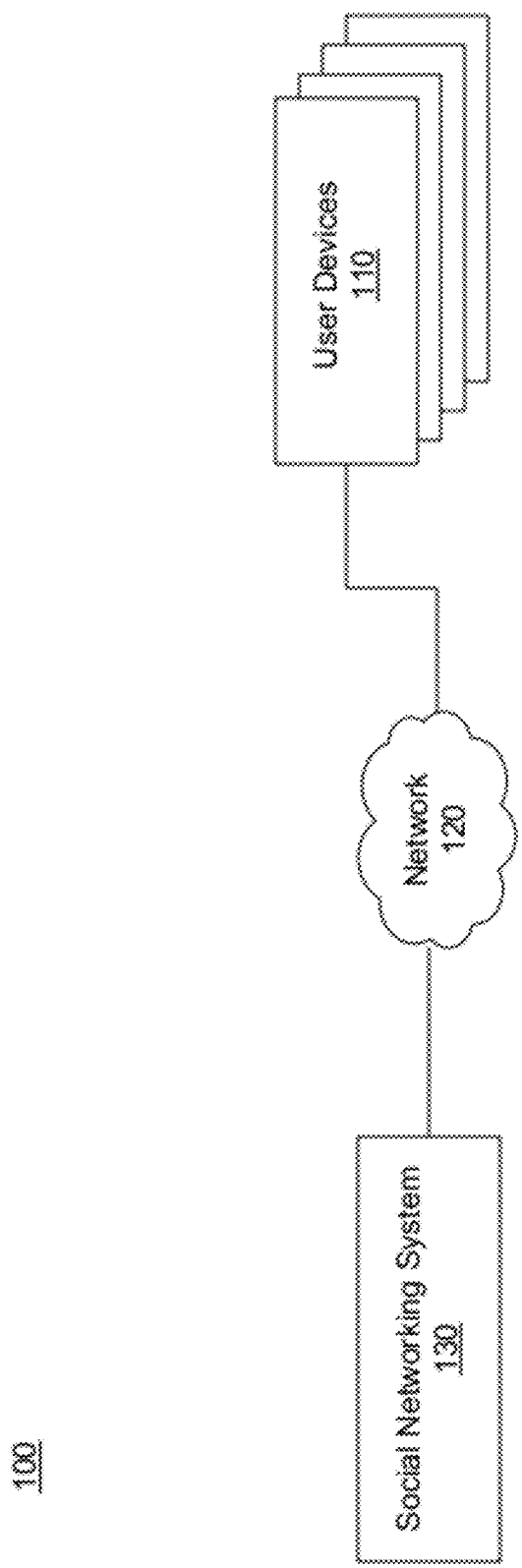
FIG. 1 is a network diagram of one embodiment of a system for tagging users of a social networking system in user profile experiences.

FIG. 1 is a network diagram of one embodiment of a system 100 for tagging users of a social networking system 130 in user profile experiences. The system 100 includes one or more user devices 110 connected via a network 120 to the social networking system 130. The social networking system 130 provides a platform, or backbone, in one embodiment which other systems may use to provide social networking services and functionalities to users across the Internet.

A user device 110 comprises one or more computing devices that can receive input from a user and can transmit and receive data via the network 120. For example, the user device 110 may be a desktop computer, a laptop computer, a smart phone, a personal digital assistant (PDAs) or any other device including computing functionality and data communication capabilities. The user device 110 is configured to communicate with the social networking system 130 via the network 120, which may comprise any combination of local area and/or wide area networks, using both wired and wireless communication systems. The user device 110 displays content from the social networking system 130.

The social networking system 130 comprises one or more computing devices storing a social network, or a social graph, comprising a plurality of users and providing users of the social network with the ability to communicate and interact with other users of the social network. In use, users join the social networking system 130 and then add connections to a number of other users of the social networking system 130 to whom they desire to be connected. As used herein, the term "friend" refers to any other user of the social networking system 130 to whom a user has formed a connection, association, or relationship via the social networking system 130. Connections may be added explicitly by a user or may be automatically created by the social networking system 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral, or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation. Using a social graph, therefore, a social networking system may keep track of many different types of objects and the interactions and connections among those objects, thereby maintaining an extremely rich store of socially relevant information.

In addition to establishing and maintaining connections between users and allowing interactions between users, the social networking system 130 provides users with the ability to take actions on various types of items supported by the social networking system 130. These items may include groups or networks (where "networks" here refer not to physical communication networks, but rather social networks of people, entities, and concepts) to which users of the social networking system may belong, events or calendar entries in which a user might be interested, computer-based applications that a user may use via the social networking system 130, transactions that allow users to buy or sell items via the service, and interactions with advertisements that a user may perform on or off the social networking system.

These are just a few examples of the items upon which a user may act on a social networking system, and many others are possible. A user may interact with anything that is capable of being represented in the social networking system 130.

The social networking system 130 is also capable of linking a variety of entities. For example, the social networking system 130 enables users to interact with each other as well as receive content from third-parties.

The social networking system 130 also includes user-generated content, which enhances a user's interactions with the social networking system 130. User-generated content may include anything a user can add, upload, send, or "post," to the social networking system 130. For example, a user communicates posts to the social networking system 130 from a user device 100. Posts may include data such as status updates or other textual data, location information, photos, videos, links, music or other similar data and/or media. The user-added content then also can be the subject of additional user content, e.g., a user can comment on a link or post, "like," a photo, link, or post, and can tag others in a photo. In another example, users may tag other users in experiences on the user profiles as described herein. Content may also be added to the social networking system 130 by a third-party through a "communication channel," such as a newsfeed or stream. Content "items" represent single pieces of content that are represented as objects in the social networking system 130. In this way, users of the social networking system 130 are encouraged to communicate with each other by posting text and content items of various types of media through various communication channels, increasing the interaction of users with each other and increasing the frequency with which users interact with the social networking system 130.

Figure 2:
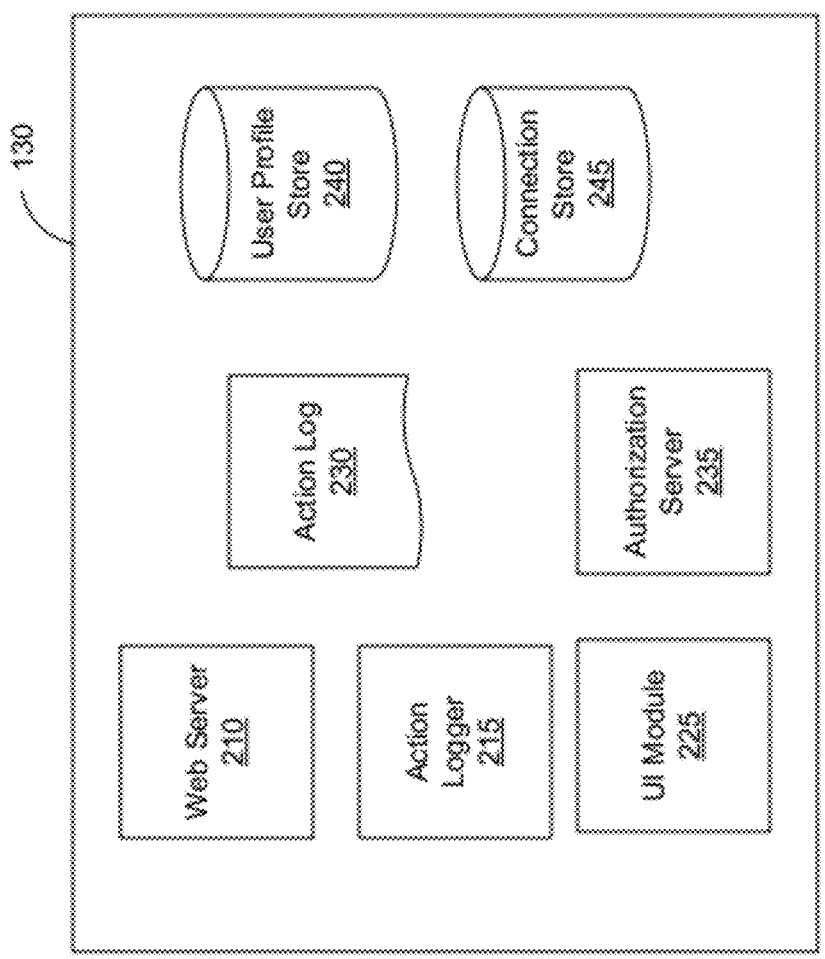
FIG. 2 is a diagram of a social networking system, in accordance with an embodiment of the invention.

FIG. 2 is a diagram of one embodiment of a social networking system 130, which is implemented as a website. In other embodiments, the social networking system 130 may provide social networking functionalities for other types of systems, such as native applications that run on the user devices 110.

The embodiment of a social networking website 130 shown by FIG. 2 includes a web server 210, an action logger 215, a user interface module 225, an action log 230, an authorization module 235, a user profile store 240, and a connection store 245. In other embodiments, the social networking website 130 may include additional, fewer, or different modules for various applications. Conventional components such as network interfaces, security mechanisms, load balancers, failover servers, management and network operations consoles, and the like are not shown so as to not obscure the details of the system.

The web server 210 links the social networking system to one or more user devices 110 via the network 120. The web server 210 serves web pages, as well as other web-related content, such as Java, Flash, XML, and so forth. The web server 210 may include a mail server or other messaging functionality for receiving and routing messages between the social networking system 130 and one or more user devices 110. The messages can be instant messages, queued messages (e.g., email), text and SMS messages, or any other suitable messaging format.

As described above in conjunction with FIG. 1, the social networking system 130 comprises a computing system that allows users to communicate or otherwise interact with each other and access content as described herein. The social networking system 130 stores user profiles describing the users of a social network in a user profile store 240. The user profiles include biographic, demographic, and other types of descriptive information. The user profile store 240 includes various information about user experiences in various categories, e.g., educational experiences, experiences, travel experiences, activity experiences, etc. The user profile store 240 may include all the experience information described herein, including information about the nesting of a hierarchy of experiences, other users tagged in an experience, and experiences in which the user was tagged on the profiles of other users.

The user profile store 240 contains data structures with fields suitable for describing a user's profile. When a new object of a particular type is created, the social networking system 130 initializes a new data structure, i.e., a "node" of the corresponding type, assigns a unique object identifier to it, and begins to add data to the object as needed. This might occur, for example, when a user becomes a user of the social networking system 130, the social networking system 130 generates a new instance of a user profile in the user profile store 240, assigns a unique identifier to the user profile, and begins to populate the fields of the user profile with information provided by the user.

In addition, the user profile store 240 may include data structures suitable for describing a user's demographic data, behavioral data, and other social data. Demographic data typically includes data about the user, such as age, gender, location, etc., e.g., as included in the user's profile. Behavioral data typically includes information about the user's activities within the social networking system 130, such as specific actions (posts, likes, comments, etc.), activity levels, usage statistics, etc. Other social data comprises information about the user from within the social networking system 130 that is not strictly demographic or behavioral, such as interests or affinities, etc.

In addition, the user profile store 240 may be accessed by other aspects of the social networking system 130, e.g., the user interface module 225 for creating and updating a user profile and its functionality as described herein. The user profile store 240 may be updated such that the user profile includes experiences added by the user or via being tagged in an experience by another user.

In use, information about new experiences or tags added via a user interface are received at the user profile store 240 from the user interface module 225. When a new experience is created, for example via one user adding a tag indicating association of another user with an experience, the social networking system 130 initializes a new node corresponding to the experience, assigns a unique object identifier to it, and begins to add data to the experience object as needed. Initially, the experience object includes the experience identifier, an experience type, and the unique identifier associated with the tagged user. As part of the method described herein, when a user is tagged, the social networking system 130 identifies a match to an existing experience object for the tagged user, or if now, creates the experience object anew. A tag association is created between the tagged user and the experience on the tagging user's user profile, and between the tagging user and the experience on the tagged user's user profile. In addition, an attribution association is added indicating that it was the tagging user who added the experience to the tagged user's user profile, rather than the tagged user himself. The user profile store 240 stores these objects and associations in the context of the tagging user and tagged user's respective user profiles.

The social networking system 130 further stores data describing one or more connections between different users in a user connection store 245. The connection information may indicate users who have similar or shared affinities such as work experience, group memberships, hobbies, educational history, or are in any way related or share common attributes. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. The connection store 245 includes data structures suitable for describing a user's connections to other users, connections to third-party content object providers 120, or connections to other entities. The connection stores 245 may also associate a connection type with a user's connections, which may be used in conjunction with the user's privacy setting, to regulate access to information about the user. In addition, the connection store 245 may be accessed by other aspects of the social networking system 130, e.g., the user interface module 225 for providing a list of connections in a drop down for tagging users in an experience as described herein.

The user interface module 225 is configured to provide a user interface for displaying to a viewer a user profile including various experiences. Data stored in the connection store 245, the user profile store 240, and the action log 230 allows the user interface module 225 access to information for creating the user profiles. The user interface module 225 may display experiences grouped by various categories, and may show a hierarchy of experiences, with higher level experiences having lower level experiences, or "projects," nested within them. The user interface module 225 provides information about newly added experiences and tags to the action logger 215 and log 230 and to the user profile store 240 to include the added items in the user's user profile. The user interface module 225 provides the functionality described in conjunction with the exemplary user profiles shown in FIGS. 4A-4C according to one embodiment.

The action logger 215 is capable of receiving communications from the web server 210 about user actions on and/or off the social networking system 130. The action logger 215 populates the action log 230 with information about user actions, allowing the social networking system 130 to track various actions taken by its users within the social networking system 130 and outside of the social networking system 130. Any action that a particular user takes with respect to another user is associated with each user's profile, through information maintained in the action log 230 or in a similar database or other data repository. Examples of actions taken by a user within the social network 130 that are identified and stored may include, for example, adding a connection to another user, sending a message to another user, reading a message from another user, viewing content associated with another user, attending an event posted by another user, tagging another user in an experience, being tagged by another user in an experience, or other actions interacting with another user. When a user takes an action within the social networking system 130, the action is recorded in an action log 230.

The action log 230 may include a history of actions even if the actions are no longer current. For example, if a user is tagged by another user in an experience, and the user removes the tag, the tag is no longer visible to other users, but the action log 230 still maintains a record of the tag (and tag removal) as actions occurring between the two users. In one embodiment, the social networking system maintains the action log 230 as a database of entries. When an action is taken within the social networking system 130, an entry for the action is added to the action log 230.

Actions taken by the user on the user profile provided by the user interface module 225 may be tracked by the action logger 215 and action log 230. In addition, the action tracker 215 may transmit communications in addition to receiving them according to one embodiment. When a new tag is received, e.g., via the user profile, the action tracker 215 performs a verification of whether the experience exists on the tagged user's profile, and if not adds it to the user profile as stored in the user profile store 240. In addition, the action tracker 215 may transmit a notification to the user via various channels according to some embodiments. Notifications may be sent via notification on the social networking system 130 pages, e-mail notification, or an SMS message on a mobile device, for example. Likewise, when a tag is removed from the experience, the action tracker 215 tracks it and updates the user profile store 240 accordingly.

The authorization server 235 enforces one or more privacy settings of the users of the social networking system 130. A privacy setting of a user determines how particular information associated with a user can be shared.

Tagging User in User Profile Experiences

In one embodiment, the social networking system 130 provides a mechanism for tagging users in user profile experiences. As used herein, the term "user profile experiences" includes all experiences that can be included in a user's user profile. A non-exclusive list of user profile experiences types, with examples, includes work experiences (e.g., positions, projects, etc.), educational experiences (e.g., schools, activities, clubs, associations, position held within a club or association, majors, minors, specific colleges/programs within a university, etc.), activity experiences (e.g., running, cooking, reading, travel, yoga, taking BART, sports, etc.), and interest experiences (e.g., musicians/groups, e.g., Gwen Stefani; food/beverage retailer, e.g., Starbuck's Coffee; authors, e.g., Barbara Kingsolver books; television shows, e.g., Mad Men; lifestyles, e.g., eating raw; e.g., annual events, e.g., Austin City Limits; associations/societies,/clubs, e.g., National Association of Women Lawyers; movements, e.g., Pay It Forward Day; movies, e.g., High Fidelity; events, e.g., Sacramento Clean Tech Showcase; art genres, e.g., photography; particular retail products/categories, e.g., Cannon cameras; places, e.g., Monterey Bay Aquarium causes, e.g., breast cancer awareness; etc.).

When a second user is tagged in an experience on a first user's user profile, the first user's user profile is updated to show the tagged second user as associated with that experience. In addition, the experience in which the second user was tagged is then added to the tagged second user's user profile. In addition, further detail about the experience can be added via the tag. For example, for the experience travel (which is fairly general), the tag can indicate cities traveled to, who traveled with, dates of travel, etc. The social networking system 130 stores the information about the experience, experience type, who provided the tag, who was tagged, the further detail, if any, and whether the experience is nested (e.g., a project within an employer).

In this way, embodiments of the invention provide for a way to associate other users with a user's experiences as well as a mechanism for populating users' user profiles with relevant experiences about users as indicated by other users. Specifically, tagging a user in an experience associates the tagged user with a group, and associated node, for the experience. The grouping allows for enhancement of the social graph by providing the social networking system 130 a greater understanding of the connections between users. In addition, users can search by experience tag, e.g., could search by "eating raw" to find other users who share the eating raw experience.

In some embodiments, experiences can be nested to form an experience hierarchy, for example, projects worked on within a work experience for an employer, clubs, or activities participated in during an educational experience, or particular races participated in within the user profile interest of running, just to name a few examples.

Figure 3:
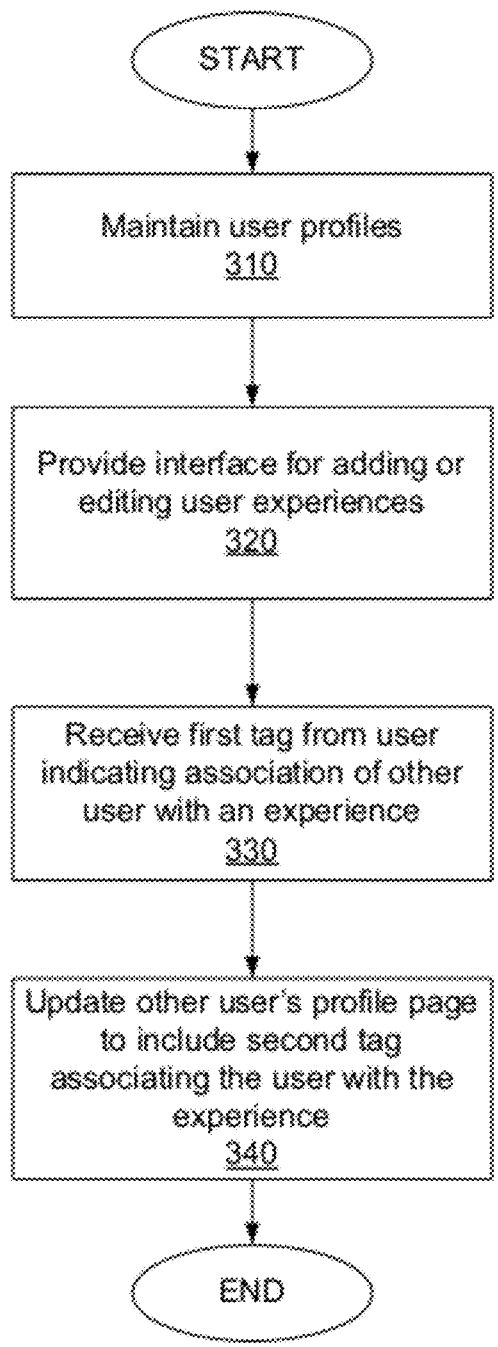
FIG. 3 is a flowchart showing one embodiment of a method for tagging users of a social networking system 130 in user profile experiences.

FIG. 3 is a flowchart showing one embodiment of a method for tagging users in user profile experiences. Initially, user profiles are maintained 310 by the social networking system 130. The user profile includes various categories of user experiences, including the various types indicated above.

Experiences are nested according to one embodiment. For example, in a work experience, a user may list various jobs that the user has had within a company, e.g., vice president and senior vice president, with each position optionally listing a date range. Similarly, in an educational experience, in addition to listing a name of a high school, the user can add activities such a student counsel and choir. These nested experiences provide richer information about the individual experiences. The social networking system 130 provides 320 an interface for the user to add to or edit the various experiences on his user profile.

The social networking system 130 receives 330 via the interface tags from the user indicating an association between another user of the social networking system 130 and the user's experience. For example, the user may add a first tag to someone he went to school with in an educational experience. Tags are received via input by the user into the interface, e.g., via a text field or the like.

In one embodiment, initiating the action of adding a tag to an experience by the user may trigger a look up of the connections of the user for anticipating which connection the user wants to tag. For example, as the user types a drop down list may appear with connections of the user matching the text entered. The user can then continue to type or select the desired connection from the list.

As indicated above, experiences may be hierarchically nested in some examples, e.g., projects worked on while working at a listed employer. The user can select to tag another user at any nested level in the hierarchy. Using the above example, the user could tag another user as working with him at the employer, or as working with him on the project.

Once the first tag is received 330 from the user, it is included on the user's user profile. In addition, a second tag indicating the user as associated with the experience is added to the other user's user profile. The system may check whether the other user has the experience, or if nested and a lower level experience, whether the other user has the higher level experience. If the other user who was tagged did not have the experience listed on his user profile, the experience also is added 340 to the other user's profile. If the user added a tag on a nested experience lower in the hierarchy (e.g., on a project within a company), then both the lower and higher level experiences (i.e., both the project and the company) are added to the other user's profile. In one embodiment, An attribution is stored indicating that the user caused the second tag to be added to the other' users user profile (i.e., rather than the other user adding it himself).

The social networking system 130 also may send a notification to the tagged user that he has been tagged in the experience. The notification may be communicated via a variety of communication channels, including notification on the social networking system 130 pages, e-mail notification, or an SMS message on a mobile device, for example. Other notification channels also are possible in various embodiments. Newly tagged experiences also may appear in news feeds for connections of the tagged user. Thus, the tagging functionality enhances the interactions between users of the social networking system 130, which enhances the social graph and creates stronger affinities between users.

The social networking system 130 also provides a mechanism for users to remove tags that are incorrect or otherwise undesired. A tagged user may request removal of a tag indicating his association with the experience. In response, the social networking system 130 removes the tagged user from the experience on the user profile of the user who provided the tag, as well as removes the experience from the tagged user's user profile.

Figure 4A:
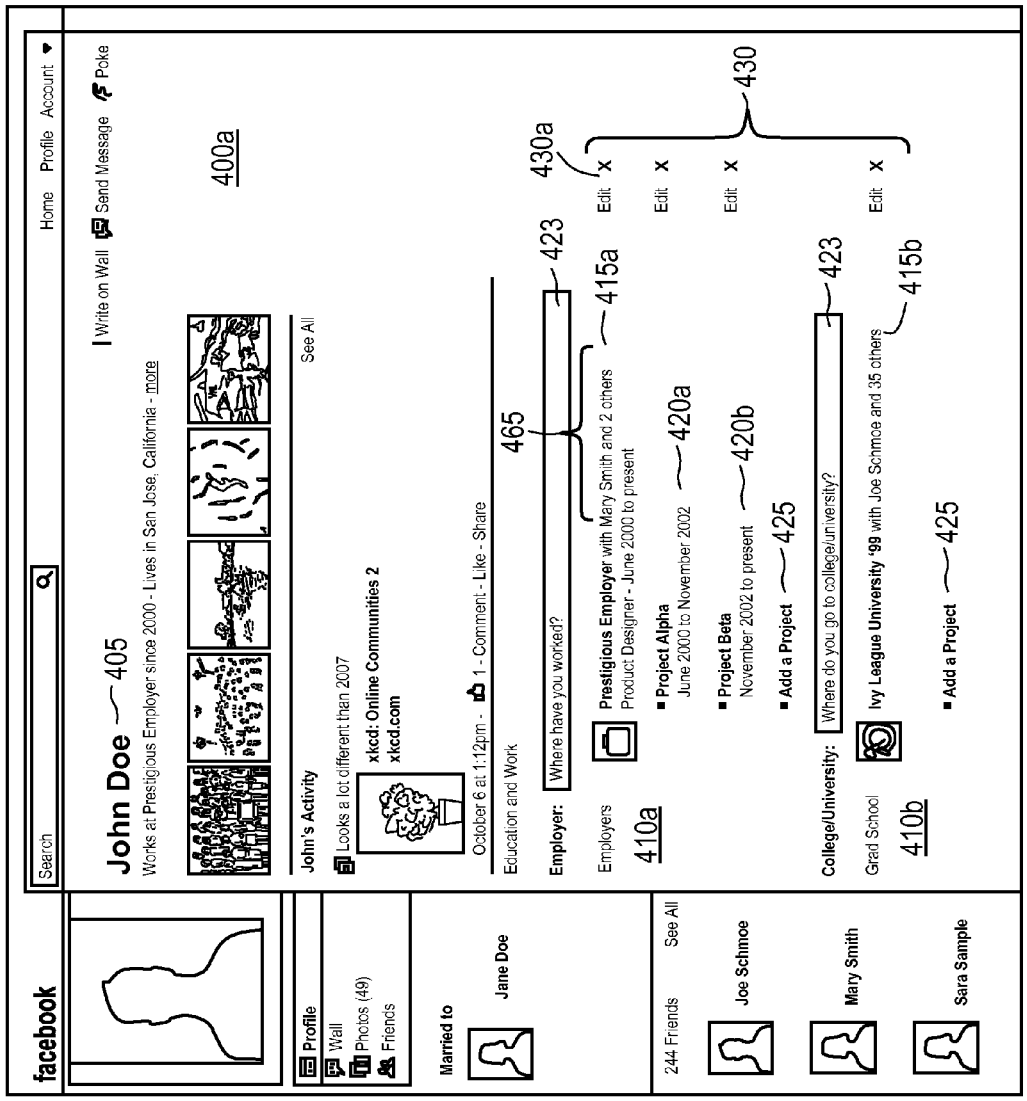
FIGS. 4A-4C are embodiments of social networking system user profile screens showing experiences for a user and for adding tags indicating association of other users with the experiences.

FIG. 4A is one embodiment of a screenshot of a social networking system user profile 400a showing experiences for user John Doe 405. In this example, the experiences include two experience categories 410, work experiences (employers) 410a and education (grad school) 410b. In other examples, a different number and/or types of items may be shown.

In this example two experiences 415, Prestigious Employer 415a and Ivy League University 415b are shown on the user profile 400a. Prestigious Employer 415a shows two nested experiences 420, or "projects": Project Alpha 420a and Project Beta 420b. Prestigious Employer 415a is considered a higher level experience, and Project Alpha 420a and Project Beta 420b lower level experiences. This nested hierarchy of experiences allows the user to provide more detailed information about the (in this case, work) experience. Various experience information is provided with each experience 415, 420, such as other users who were associated with the experience (e.g., Mary Smith and 2 others), title (e.g., Project Designer), and duration of experience (e.g., June 2000 to present). In addition, a control may be provided (not shown) to tagged users 465 that allows the tagged user viewer to remove the tag, e.g., if erroneous or otherwise undesired.

The user profile 400a provides a control for editing 430 each experience. User selection of the Edit control 430 activates an edit experience screen 400b as described in conjunction with FIG. 4B. The user profile 400a also provides a field for adding a new experience 423 and a control for adding a project 425 to an existing experience (e.g., 415a). User selection of the Add a Project control 425 activates an add project screen 400c as described in conjunction with FIG. 4C.

Figure 4B:
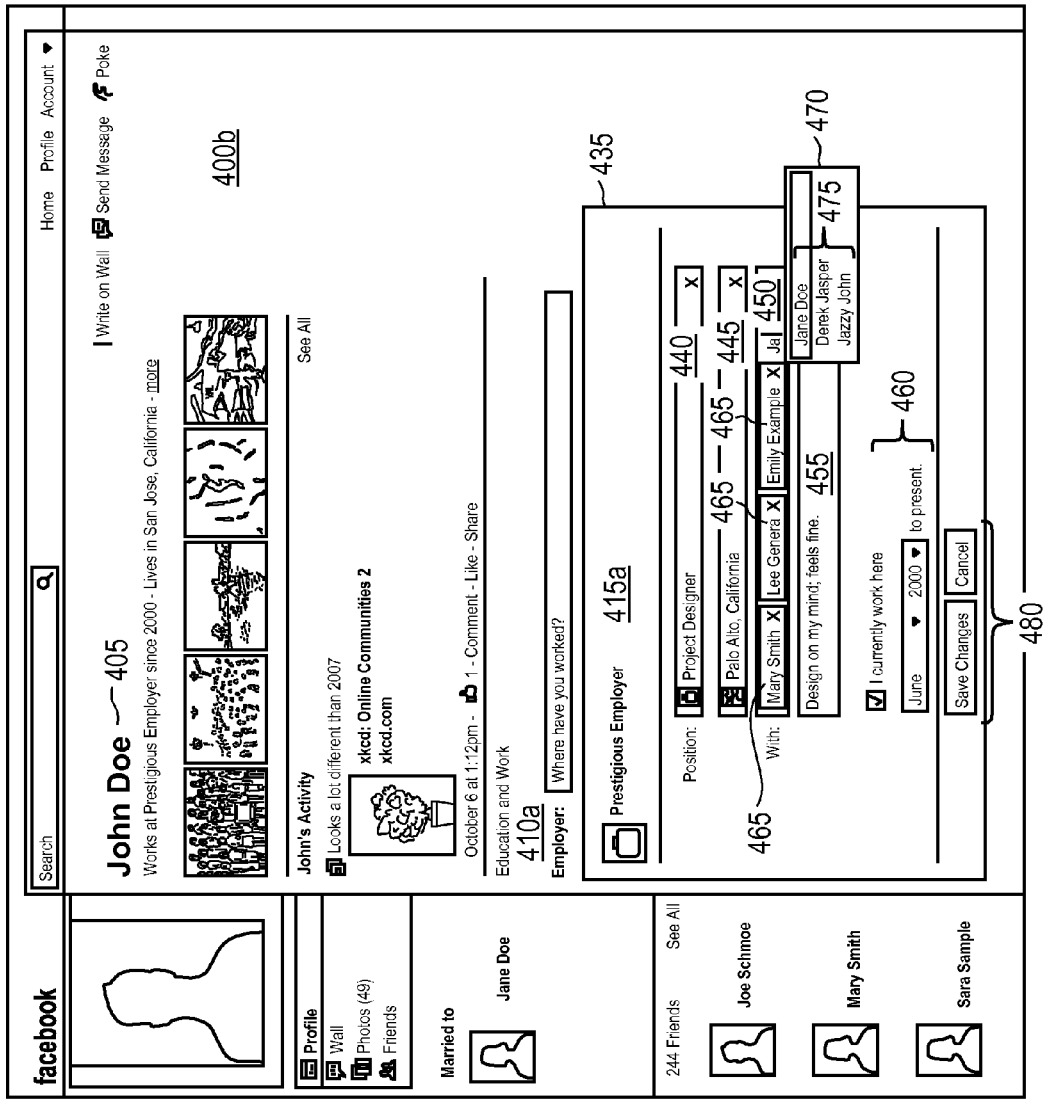

FIG. 4B is an embodiment of a screenshot of a social networking system user profile showing an edit experience screen 400b. The edit experience screen 400b replaces a portion of the user profile 400a shown in FIG. 4A with an edit experience control area 435. In this example, the experience being edited is Prestigious Employer 415, as a result of selection of Edit control 430a of FIG. 4A. The edit experience control area 435 allows the user to edit various functions within the experience, such as editing, removing, or replacing a position via position field 440; editing, removing, or replacing a city via a city field 445; tagging or removing tags indicating the association of other users via a user tagging field 450; editing, removing, or replacing a description of the experience via a description field 455; and adjusting a time period worked via time period controls 460. Additional controls 480 allow the profile owner to Save or Cancel any changes made via the edit experience control area 435.

In use, the user tagging field 450 allows the profile owner to tag other users 465 in the experience. The tagged other users 465 are displayed with the experience information 415a, e.g., as shown in FIG. 4A. In response to typing text into the tagging field 450, a drop down 470 is displayed to the viewer including connections 475 whose names match the entered text. In the example depicted, the user has typed in "Ja" into the tagging field 450. The social networking system 130 has determined which of the user's connections have text matching Ja, and has included them in the list of connections 475: Jane Doe, Derek Jasper, Jazzy John. The tagging field 450 thus presents a type-ahead input field that presents suggestions to the user as to possible matches in the form of a drop down menu 470. This functionality can be implemented using various technologies, for example Java Script and AJAX. E.g., as the user enters the text, the browser issues an AJAX request to the server by passing the text as the parameter. The server returns a list of suggestions matching the parameter to the browser for display (e.g., as a drop down menu 470).

In one embodiment, one or more search algorithms perform a prefix search in which the search matches objects with name tokens, such as a first or last name associated with a user object, for which the query is a prefix. The prefix search may be performed again for each new character that the user enters into the search interface, such that the combined result set may contain fewer matching objects. For example, when the user types additional characters into the search interface, fewer objects may match the (now longer) typed query, and hence the combined result set would include fewer objects. For additional detail about this typeahead functionality, see U.S. patent application Ser. No. 12/816,377, entitled "Search and Retrieval of Objects in a Social Networking System," filed Jun. 15, 2010, which is hereby incorporated by reference in its entirety.

The profile owner can select from the connections 475 a user to be tagged. Once a user is tagged, he is added to the tagged users 465, as shown in FIG. 4B (and FIG. 4A after saving). As discussed elsewhere herein, tagging a user also may trigger an experience to appear on the tagged user's profile and/or trigger a notification about the tag to the tagged user.

Figure 4C:
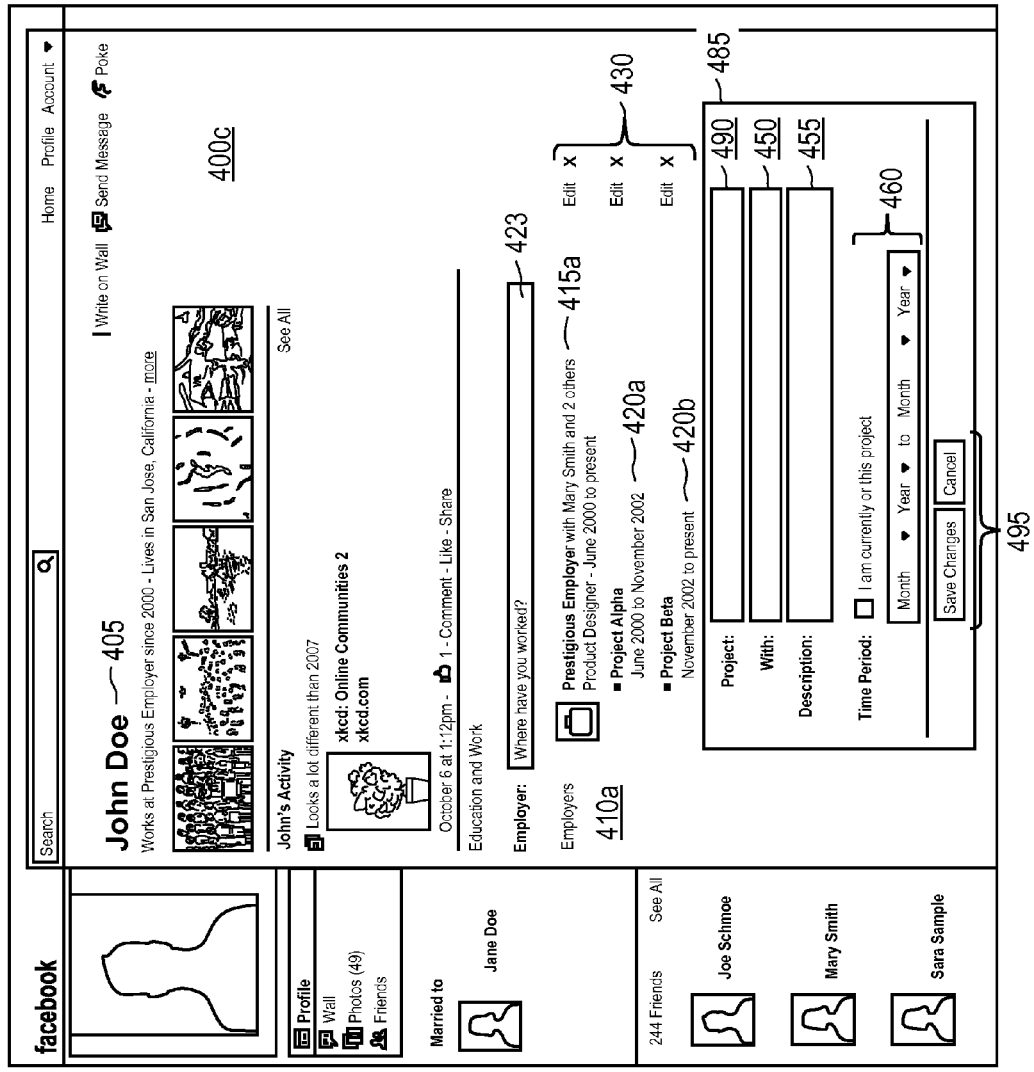

Referring again to FIG. 4A, one or more Add a Project controls 425 are provided for adding experiences (or projects) within existing projects. FIG. 4C is an embodiment of a screenshot of a social networking system user profile showing an add project screen 400c. The add project screen 400c is similar to the user profile 400a of FIG. 4A, except that a portion of the profile is replaced with an add project control area 485. The add project control area 485 allows the profile owner to enter a new project, and includes a project field 490, a user tagging field 450, a description field 455, and time period controls 460. Additional controls 495 allow the profile owner to add the project (save it) or cancel the project add. As indicated by the like reference numerals used, the user tagging field 450, description field 455, and time period controls 460 function similar to those described in conjunction with FIG. 4B above. Once added, the new project appears in the appropriate level of experiences on the user profile 400a, e.g., as an additional project 420 in FIG. 4A.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   maintaining a user profile for each of a first user and a second user of a social networking system;
   providing an interface for adding or editing one or more experiences associated with the first user's user profile, wherein an experience of the one or more experiences describes at least one of where the first user works or has worked, or where the first user attends school or has attended school, and the interface is a profile page associated with the first user;
   receiving via the interface a first tag indicating that the second user participated in one or more of the experiences on the first user's user profile; and
   responsive to receiving the first tag,
      determining whether the second user's user profile includes the one or more experiences, and
      responsive to the determination, updating the second user's user profile to include a second tag indicating that the first user participated in the one or more experiences if the second user's user profile includes the one or more experiences, or updating the second user's user profile to include the one or more experiences and the second tag if the second user's user profile does not include the one or more experiences; and
   providing for display to the first user a page including the first user's user profile, the page including the first tag indicating that the second user participated in one or more of the experiences on the first user's user profile; and
   providing for display to the second user a page including the updated second user's user profile, the page including the second tag.

2. The method of claim 1, further comprising providing for display to a viewing user a page including the first user's user profile, the page including the first tag indicating that the second user participated in one or more of the experiences on the first user's user profile.

3. The method of claim 1, further comprising providing for display to a viewing user a page including the updated second user's user profile, the page including the second tag.

4. The method of claim 1, wherein the one or more experiences are organized into categories.

5. The method of claim 4, wherein the experience category is selected from a group consisting of work experiences, or educational experiences.

6. The method of claim 1, further comprising:
   maintaining a plurality of connections associated with the first user;
   wherein receiving via the interface the first tag indicating that the second user participated in one or more of the experiences on the first user's user profile further comprises:
      receiving an action selecting the one or more experiences for editing;
      receiving entry of text by the first user;
      providing a list of selected connections associated with the first user comprising names matching the received text, the list of selected connections including the second user; and
      receiving selection by the first user of the second user from the list of selected connections.

7. The method of claim 6, wherein the list of selected connections is provided via a drop down menu in the interface that presents matches corresponding to type-ahead functionality associated with the received text.

8. The method of claim 1, further comprising storing an attribution indicating that the first user caused the one or more experiences to be added to the second user's user profile.

9. The method of claim 1, wherein the received first tag indicates an association between the second user and a lower level experience nested within a higher level experience, and updating the second user's user profile to include a second tag indicating that the first user participated in the one or more experiences further comprises:
   determining whether the second user's user profile includes the lower level experience; and
   in response to a determination that the second user's user profile does not include the lower level experience, adding the lower level experience and the higher level experience to the second user's user profile.

10. The method of claim 1, further comprising providing a notification to the second user that the second user was tagged in the one or more experiences and the one or more experiences were added to the second user's user profile.

11. The method of claim 10, wherein the notification is communicated via a communication channel selected from the group consisting of a notification within the social networking system, an email notification, and an SMS notification.

12. The method of claim 10, wherein the notification indicates that the first user caused the second tag to be added to the second user's user profile.

13. The method of claim 1, further comprising:
   receiving a request from the second user to remove the second tag indicating that the first user participated in the one or more experiences;
   responsive to receiving the request:
      removing the second tag; and
      removing the one or more experiences from the second user's user profile.

14. A method, comprising:
   maintaining a user profile for each of a first user and a second user of a social networking system;
   maintaining a plurality of connections associated with the first user;
   providing an interface for adding or editing one or more experiences associated with the first user's user profile, wherein an experience of the one or more experiences describes at least one of where the first user works or has worked, or where the first user attends school or has attended school, and the interface is a profile page associated with the first user;
   receiving via the interface a first tag indicating that the second user participated in one or more experiences on the first user's user profile, further comprising:
      receiving an action selecting the one or more experiences for editing;
      receiving entry of text by the first user;

providing a list of selected connections associated with the first user comprising names matching the received text, the list of selected connections including the second user; and receiving selection by the first user of the second user from the list of selected connections;

responsive to receiving the first tag, determining whether the second user's user profile includes the one or more experiences, and responsive to the determination, updating the second user's user profile to include a second tag indicating that the first user participated in the one or more experiences if the second user's user profile includes the one or more experiences, or updating the second user's user profile to include the one or more experiences and the second tag if the second user's user profile does not include the one or more experiences;

providing for display to the first user a page including the first user's user profile, the page including the first tag indicating that the second user participated in one or more of the experiences on the first user's user profile; and providing a notification to the second user that the second user was tagged in the one or more experiences and the one or more experiences were added to the second user's user profile; and providing for display to the second user a page including the updated second user's user profile, the page including the second tag and including the one or more experiences indicated by the second tag.

15. The method of claim 14, further comprising providing for display to a viewing user a page including the updated second user's user profile, the page including the second tag and including the one or more experiences indicated by the second tag.

16. The method of claim 14, further comprising:
receiving a request from the second user to remove the second tag indicating that the first user participated in the one or more experiences; and
responsive to receiving the request:
removing the second tag; and
removing the one or more experiences from the second user's user profile.

17. A method comprising:
producing a user interface including a user profile associated with a first user wherein the user interface is a profile page associated with the first user, the user interface comprising:
providing a control for receiving from the first user a first tag indicating that a second user participated in one or more of the experiences on the first user's user profile, wherein an experience of the one or more experiences describes at least one of where the first user works or has worked, or where the first user attends school or has attended school; and
wherein the first tag is added to the first user's user profile responsive to the receiving;
determining whether the second user's user profile includes the one or more experiences;
responsive to the determination, updating the user profile to include a second tag indicating that a second user participated in an experience if the user profile includes the experience, or updating the user profile to include the experience and the second tag if the user profile does not include the experience;
providing for display to the first user a page including the first user's user profile, the page including the first tag indicating that the second user participated in one or more of the experiences on the first user's user profile; and
providing for display to the second user a page including the updated second user's user profile, the page including the second tag.

18. The method of claim 17, wherein the one or more experiences are organized into categories and the experience category is selected from a group consisting of work experiences, or educational experiences.

19. The method of claim 17, further comprising:
providing a display element on the user profile comprising:
providing a text entry field for receiving entry of text by the first user indicating the second user; and
providing a list of selected connections associated with the first user comprising names matching the text, the names including the second user; and
wherein the first tag is added to the first user's user profile responsive to selection of the second user from the list of selected connections.

20. The method of claim 19, wherein the list of selected connections is provided via a drop down menu in the interface that presents matches corresponding to type-ahead functionality associated with the received text.

21. The method of claim 17, further comprising:
providing a remove tag control on the user profile when a viewer of the user profile is the second user; and
wherein the first tag is removed from the user's user profile responsive to selection of the remove tag control by the second user.

* * * * *